United States Patent [19]

Drebenstedt

[11] Patent Number: 5,710,687
[45] Date of Patent: Jan. 20, 1998

[54] LIFTER DEVICE FOR MAGNETIC DISK CARTRIDGE HAVING A CURVED SPRING STRUCTURE

[75] Inventor: Walter Duane Drebenstedt, Daleville, Ala.

[73] Assignees: Sony Corporation, Japan; Sony Electronics Inc., N.J.

[21] Appl. No.: 574,034

[22] Filed: Dec. 18, 1995

[51] Int. Cl.$^6$ .................................. G11B 23/02
[52] U.S. Cl. .................................. 360/133
[58] Field of Search .................. 360/128, 133; 369/291, 72; 15/DIG. 14

[56] References Cited

U.S. PATENT DOCUMENTS

| | | | |
|---|---|---|---|
| 4,510,546 | 4/1985 | Asami et al. | 360/133 |
| 4,620,247 | 10/1986 | Papciak et al. | 360/133 |
| 4,648,002 | 3/1987 | Mroz et al. | 360/137 |
| 4,677,517 | 6/1987 | Gelardi et al. | 360/133 |
| 4,739,433 | 4/1988 | Oishi | 360/133 |
| 4,750,075 | 6/1988 | Oishi | 360/133 |
| 4,809,114 | 2/1989 | Seto | 360/133 |
| 4,979,065 | 12/1990 | Ikebe et al. | 360/133 |
| 5,083,231 | 1/1992 | Veenstra et al. | 360/133 |
| 5,164,239 | 11/1992 | Ozawa et al. | 360/133 |
| 5,326,608 | 7/1994 | Ikebe et al. | 360/113 |
| 5,327,314 | 7/1994 | Kikuchi et al. | 360/133 |
| 5,359,483 | 10/1994 | Arsenault | 360/133 |
| 5,432,662 | 7/1995 | Kato et al. | 360/133 |

FOREIGN PATENT DOCUMENTS

| | | | |
|---|---|---|---|
| 63-231776 | 9/1988 | Japan | 360/133 |
| 1-105372 | 4/1989 | Japan | 360/113 |

*Primary Examiner*—Stuart S. Levy
*Assistant Examiner*—George J. Letscher
*Attorney, Agent, or Firm*—Ronald P. Kananen

[57] ABSTRACT

A lifter device for a magnetic recording diskette which has a resilient, flexible, relatively rigid plastic sheeting, such as polyethylene terephthalate (PET). The lifter device curves upward from an inner surface of the casing to which it is affixed toward a pad which contacts the recording material within the diskette. The lifter maintains a desired amount of pressure against the pad over an extended range of operating conditions.

16 Claims, 3 Drawing Sheets

LIFTER DEVICE FOR MAGNETIC DISK CARTRIDGE HAVING A CURVED SPRING STRUCTURE

FIELD OF THE INVENTION

This invention relates to magnetic disk cartridges. More particularly, this invention relates to an improved curved spring structure, usually referred to as a "lifter," which maintains accurate positioning of a recording medium in a floppy disk over an extended time and a wide range of operating conditions.

BACKGROUND OF THE INVENTION

Magnetic floppy disk cartridges are widely used for data storage. As illustrated in FIG. 1, a conventional 3.5 inch "micro" floppy disk cartridge comprises a thin circular magnetic recording medium (flexible disk) disposed between two liners (cleaning sheets) provided within an inner portion of a molded upper shell and a lower shell. Each liner is typically formed of an unwoven fabric of rayon or polyester, for example, and is kept in contact with the recording surface of the disk in order to remove dust while the disk is rotated. Such a conventional magnetic floppy disk cartridge is described in greater detail in U.S. Pat. No. 4,510,546, the disclosure of which is incorporated by reference herein.

Conventionally, a lifter is attached to the lower shell of the magnetic floppy disk cartridge so as to exert pressure against the liner to maintain contact between the liner and the recording surface. Several lifter designs have been utilized in connection with prior techniques to provide this pressure. A typical design utilizes a planar polyethylene terephthalate ("PET") sheet bent at a portion thereof which is mounted to the inner liner.

Such a conventional lifter 10 is illustrated in FIG. 2. This structure comprises a first planar region 12 which includes an adhesive layer 14 on a lower surface thereof so as to adhere the lifter 10 to the cartridge shell. The lifter 10 has a second planar region 18 which is in effect a single angularly inclined leaf having a front end 16 which exerts a biasing force upon an adjacent liner. Generally, such prior art lifters have a width of about 2 cm so as to extend across a substantial radial portion of the liner which covers the recording medium.

While PET lifters according to the prior art are relatively inexpensive to manufacture, they are characterized by certain drawbacks. For example, at higher temperatures which may occur during storage or during operation, conventional PET lifters may substantially lose their elastic force, particularly where such higher temperatures are accompanied by high humidity. Furthermore, such prior art lifters may lose elastic force over time. As a result of this loss of elastic force, less torque is exerted against the liner. This, in turn, may cause mischucking of the disk and misplacing of data on the disk. It may also result in a failure of adequately cleaning the disk which, in turn, may lead to data loss.

Several prior art techniques have attempted to address these limitations. For example, it is known to utilize metal lifters in place of PET lifters. However, metal lifters are significantly more expensive and more difficult to manufacture. It is also known to bend the lifter along a line, thus to close the clearance inside the magnetic floppy disk shell. It is further known to mold a ridge on the shell underneath the lifter so as to preload the lifter. These other techniques are generally complicated to manufacture and assemble, and have other drawbacks associated with them.

Accordingly, there is a need to provide a low cost lifter which provides a desired level of torque over a prolonged period of time and over an extended range of operation environments.

SUMMARY OF THE INVENTION

It is an object of the invention to meet the aforementioned needs. In fulfillment of this object, a lifter according to the present invention comprises a resilient, flexible, relatively rigid plastic sheeting, such as polyethylene terephthalate (PET). The lifter device curves upward from an inner surface of the casing to which it is affixed toward a pad which contacts the recording material within the diskette. The lifter maintains a desired amount of pressure against the pad over an extended range of operating conditions.

By curving the spring material of the lifter into a smooth arc, the lifter becomes self-compensating. As the material of the lifter relaxes at the fulcrum point, the fulcrum point moves to a new position and new material is stressed.

DETAILED DESCRIPTION OF THE PREFERRED EMBODIMENT

Figure 1:
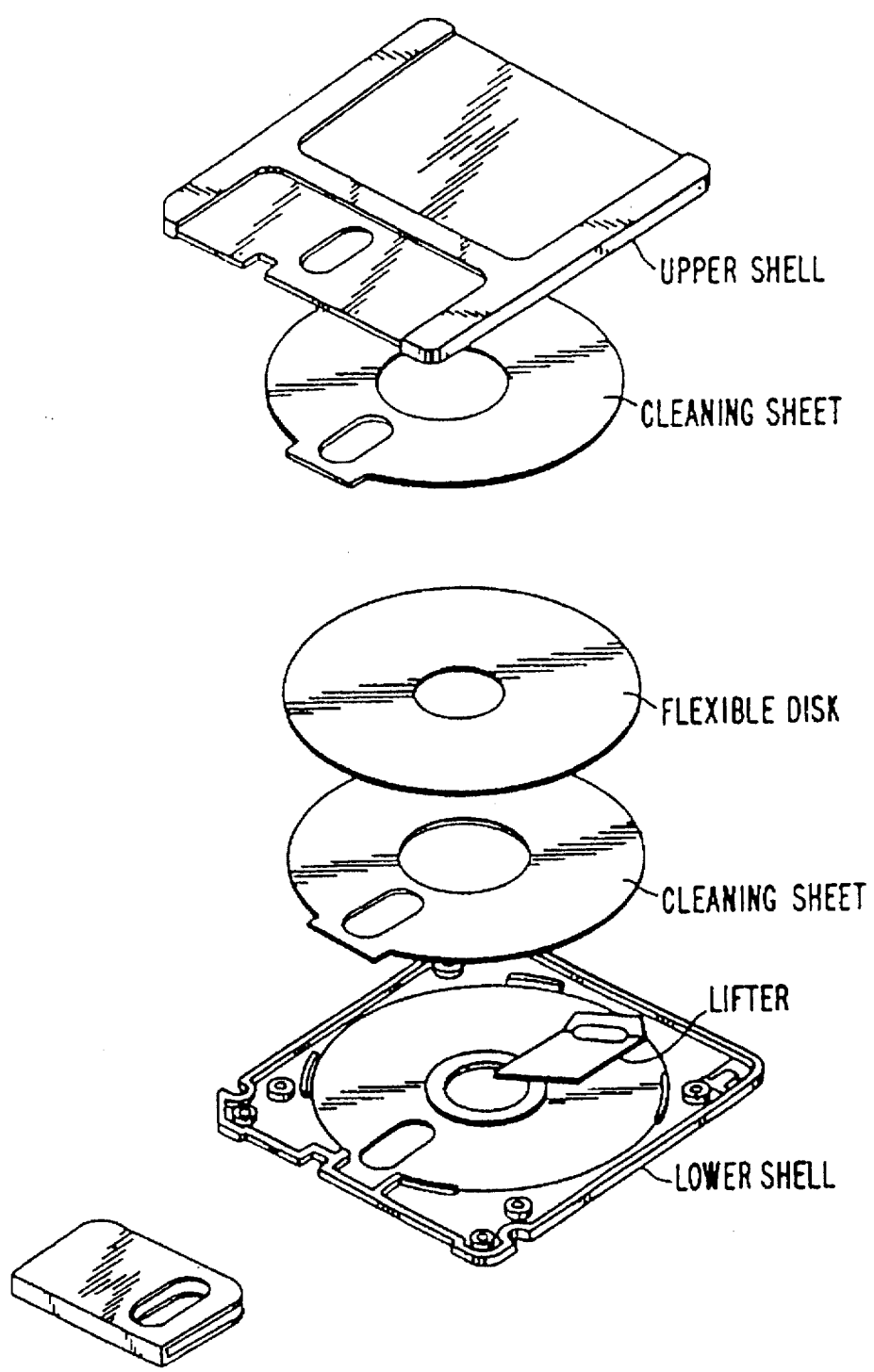
FIG. 1 is an exploded perspective view of a conventional magnetic recording disk cartridge.
Figure 2:
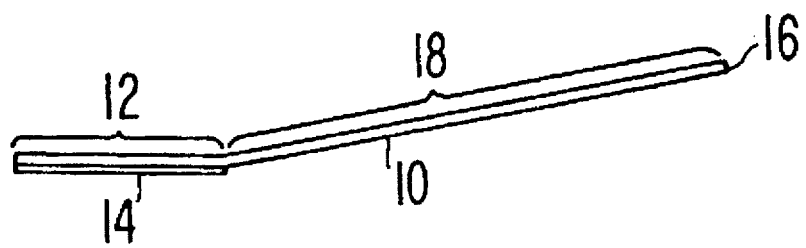
FIG. 2 is a side elevational view of a lifter according to the prior art.
Figure 3:
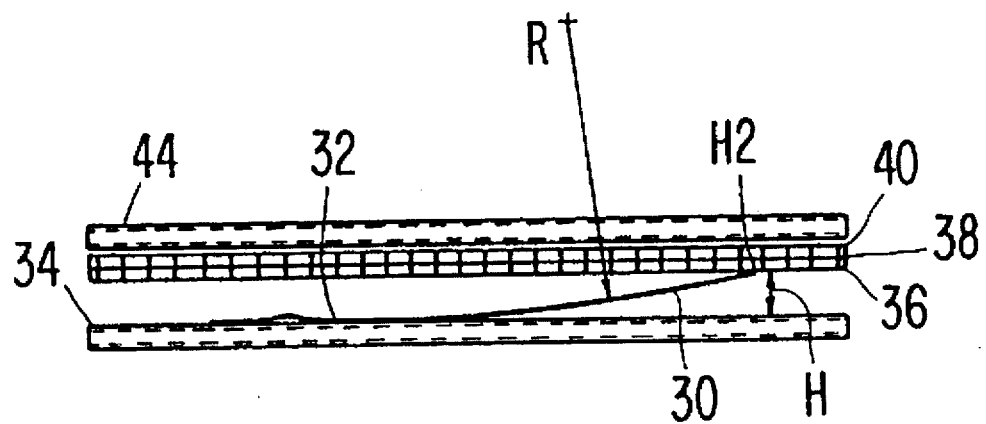
FIG. 3 is a side elevational view of a curved lifter according to the invention.
Figure 4:
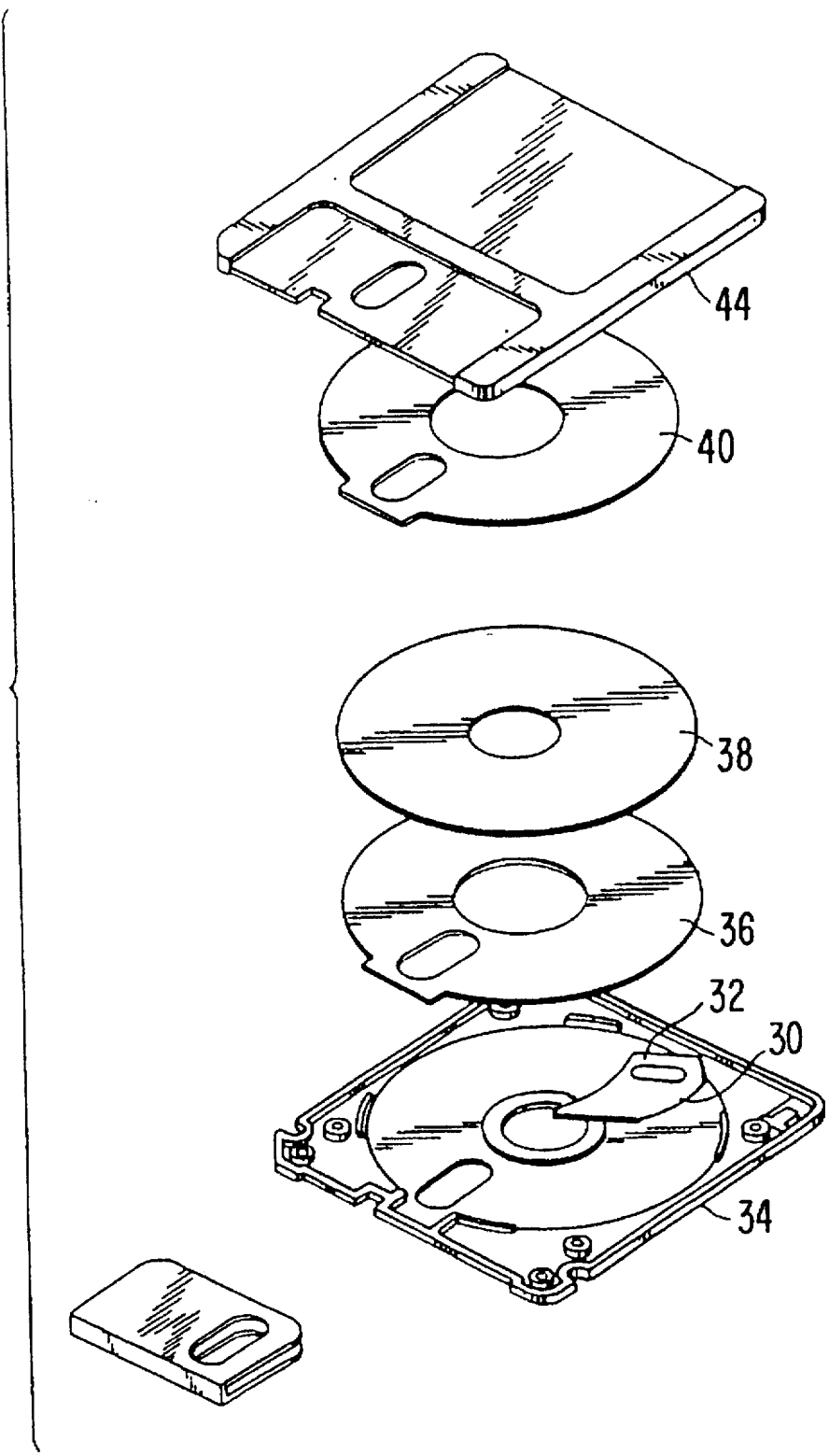
FIG. 4 is an exploded perspective view of a magnetic recording disk cartridge having a curved lifter according to the invention.

FIGS. 3 and 4 depict one embodiment of a resilient, flexible, relatively rigid, curved lifter 30 according to the invention. As shown, the lifter 30 has a lower portion 32 fixedly attached to a lower shell 34 of a magnetic floppy disk through various techniques known in the art. For example, the lifter 30 may be stake welded to the lower shell 34. Alternately, various other techniques, such as pressure adhesives, may be employed. However, where welding is used, care must be exercised that the lifters are not over-welded so as to avoid deformations forming in the lifter material which may cause "dimples." Such dimples may result in increased torque, small areas of high friction on the recording medium, and ineffective cleaning.

The lifter 30 extends from the first portion and curves upward into a lower liner element 36. Thus, as shown, the lifter 30 forms a concave curve relative to the lower shell 34 to which the lifter is adhered. In this way, the lifter 30 exerts an elastic force against a lower liner element 36. This, in turn, creates pressure which causes the recording medium 38 to contact the lower liner element 36 and an upper liner element 40 that is attached to an upper shell 44. The lifter according to the invention ensures that the magnetic recording material 38 is positioned in a desired manner to provide accurate data reading, while at the same time undergoing a cleaning action as a result of rotational motion within the shell of the magnetic floppy disk.

The lifter according to the invention preferably comprises a substantially uniform plastic sheeting, such as PET. This material offers lower manufacturing costs. For example, the lifter may be manufactured by cutting sheets of PET into strips having a width of standard lifters. The strips are then fed through a forming die which heats, forms, and then cools the material into strips having curved shape described herein. The formed strips are fed to a cutting die, and then lifters are cut from the preformed material.

In a preferred embodiment, a PET lifter was formed having a radius of curvature of 40 mm. This example was formed by heating the PET lifters and holding them against an 80 mm diameter die until they cooled. Other PET lifters have been formed with varying degrees of curvature R as described below.

It has been found that curved PET lifters according to the invention provide the desired range of torque (and thus proper placement of the recording medium) over a wide range of operating conditions. Experimental comparisons between the curved lifter according to the invention and standard flat lifters are summarized below.

EXAMPLE 1

In a first example, conventional flat PET lifters and curved PET lifters according to the invention were assembled and then placed in an environmentally-controlled chamber set to normal operating conditions (that is, approximately room temperature). The curved lifters were preformed to have a curvature wherein the height H as measured from the proximate end 42 of the lifter 32 (see FIG. 3) was approximately 7 mm when the lifter was first adhered to the lower shell (and not in contact with a pad). The results of this comparative example are summarized in Table 1, which sets forth average torque measurements for each set of samples at various time intervals measured from both assembly and from introduction into a controlled environment.

TABLE 1

| (Normal Conditions) | | | | | | | |
|---|---|---|---|---|---|---|---|
| HOURS ASSEMBLED | 0 | 24 | 48 | 72 | 96 | 144 | 264 |
| HOURS IN CHAMBER | | | | 0 | 24 | 72 | 168 |
| Flat | 18.0 | 13.9 | 13.9 | 13.8 | 12.3 | 12.0 | 11.9 |
| Curved | 16.6 | 14.5 | 12.1 | 12.2 | 11.5 | 10.5 | 10.1 |

EXAMPLE 2

In a second example, conventional flat PET lifters and curved PET lifters according to the invention were assembled and then placed in an environmentally-controlled chamber having an ambient temperature of approximately 60° C. In this example, the curved lifters were preformed to have a curvature wherein the height H (as defined above) was approximately 7 mm. The results of this comparative example are summarized in Table 2, which sets forth average torque measurements for each set of samples at various time intervals measured from both assembly and from introduction into the controlled-environment chamber.

TABLE 2

| (60° C.) | | | | | | | |
|---|---|---|---|---|---|---|---|
| HOURS ASSEMBLED | 0 | 24 | 48 | 72 | 96 | 144 | 264 |
| HOURS IN CHAMBER | | | | 0 | 24 | 72 | 168 |
| Flat | 18.0 | 14.8 | 14.8 | 14.1 | 6.6 | 6.9 | 6.7 |
| Curved | 16.9 | 13.3 | 13.3 | 12.7 | 6.9 | 7.2 | 6.7 |

EXAMPLE 3

In a third example, conventional "bent" planar PET lifters and curved PET lifters according to the invention were assembled, and then placed in an environmentally-controlled chamber having an ambient temperature of approximately 50° C. and a relative humidity of 95%. In this example, the curved lifters were preformed to have a curvature wherein the height H (as defined above) was approximately 7 mm. The results of this comparative example are summarized in Table 3, which sets forth average torque measurements for each set of samples at various time intervals measured from both assembly and from introduction into the controlled-environment chamber.

TABLE 3

| (50° C., 95% R.H.) | | | | | | | |
|---|---|---|---|---|---|---|---|
| HOURS ASSEMBLED | 0 | 24 | 48 | 72 | 96 | 144 | 264 |
| HOURS IN CHAMBER | | | | 0 | 24 | 72 | 168 |
| Flat | 19.3 | 15.8 | 15.9 | 15.9 | 5.1 | 4.9 | 4.3 |
| Curved | 16.3 | 12.9 | 12.9 | 12.3 | 6.0 | 6.4 | 5.6 |

As made apparent from the above-described examples, the curved PET lifters according to the invention exhibit improved characteristics in comparison with conventional flat PET lifters upon introduction to adverse environments having elevated temperatures and humidity. Thus, it can be expected that the curved lifters according to the invention maintain acceptable performance despite repeated use and despite use under conditions of elevated temperatures and humidity.

As used in this application, it will be understood that the liner elements 36 and 40 can be described as "pad members," and that the lifter 30 can be described as a "curved leaf spring structure."

Although the teachings of this invention have herein been discussed with reference to specific embodiments, it is to be understood that these are by way of illustration only and that others may wish to utilize the invention in different designs or applications.

What is claimed is:

1. A disk apparatus comprising:
   a casing;
   a planar, circular shaped recording material rotatably disposed within said casing;
   a pair of pad members disposed on opposing surfaces of said recording material; and
   a spring structure comprising a resilient, flexible, relatively rigid plastic sheeting disposed within said casing, said spring structure having a lower portion affixed to an inner surface of said casing, said spring structure extending from said inner surface of said casing to contact one of said pair of pad members, thereby providing pressure against the one of said pair of pad members to which said spring structure portion contacts;
   wherein said spring structure consists essentially of polyethylene terephthalate; and
   wherein said spring structure has a convex curve shape on a side of said spring structure facing away from said pad members and wherein said spring structure has a radius of curvature of approximately 40 mm between an end portion and said lower portion prior to being compressed by the one of said pair of pad members to which said spring structure contacts.

2. A disk apparatus according to claim 1, wherein said convex curve shape extends over a length of said spring structure, and said spring structure exerts a substantially uniform pressure across a portion of the one of said pair of pad members to which said spring structure contacts.

3. A disk apparatus according to claim 1, wherein said spring structure has an end portion which is disposed approximately 7 mm apart from said inner surface of said casing prior to being compressed by the one of said pair of pad members to which said spring structure contacts.

4. A lifter device for maintaining a predetermined amount of pressure between a pad and a recording medium disposed in a magnetic recording cartridge, said lifter device comprising:

a curved leaf spring structure extending from a lower portion that is affixed to an inner surface of said casing toward said pad, said spring structure providing pressure against said pad;

wherein said lifter device is formed of a resilient, flexible, relatively rigid plastic sheeting consisting essentially of polyethylene terephthalate; and wherein said spring structure has a convex curve shape on a side of said spring structure facing away from said pad, and wherein said spring structure has a radius of curvature of approximately 40 mm between an end portion and said lower portion prior to being compressed by said pad.

5. A lifter device as set forth in claim 4, wherein said convex curve shape extends over a length of said spring structure, and said spring structure exerts a substantially uniform pressure across a portion of the pad.

6. A lifter device as set forth in claim 4, wherein said lifter device has an end portion which is disposed approximately 7 mm apart from said inner surface of said casing prior to being compressed by said pad.

7. A lifter device for maintaining a predetermined amount of pressure between a pad and a recording medium disposed in a magnetic recording cartridge, said lifter device comprising:

a curved leaf spring structure having a first portion affixed to an inner surface of a casing of said cartridge and a second portion for contacting and providing a spring pressure against said pad, said spring structure having a convex curve shape prior to being compressed by said pad, said convex curve shape extending from said first portion to said second portion on a side of said spring structure facing said inner surface of said casing, wherein said spring structure has a radius of curvature of approximately 40 mm between said first and second end portions prior to being compressed by said pad.

8. A lifter device as set forth in claim 7, wherein said lifter device is formed of a resilient, flexible, relatively rigid plastic sheeting consisting essentially of polyethylene terephthalate.

9. A lifter device as set forth in claim 7, wherein said lifter device exerts a substantially uniform pressure across a portion of said pad.

10. A lifter device as set forth in claim 7, wherein said second portion of said spring structure is disposed approximately 7 mm apart from said inner surface of said casing prior to being compressed by said pad.

11. A lifter device as set forth in claim 7, wherein said convex curve shape is on a side of said spring structure facing away from said pad.

12. A disk apparatus comprising:

a casing having an outer and an inner surface;

a planar, circular shaped recording material rotatably disposed within said casing;

a pair of pad members disposed on opposing surfaces of said recording material; and a spring structure comprising a resilient, flexible, relatively rigid sheeting disposed within said casing, said spring structure having a first portion affixed to an inner surface of said casing and a second portion for contacting and providing a spring pressure against one of said pad members;

wherein said spring structure has a convex curve shape prior to being compressed by said one of said pad members, said convex curve shape extending from said first portion to said second portion on a side of said spring structure facing said inner surface of said casing, and wherein said convex curve shape has a radius of curvature of approximately 40 mm prior to being compressed by said one of said pad members.

13. A disk apparatus according to claim 12, wherein skid spring structure exerts a substantially uniform pressure across a portion of said one of said pad members.

14. A disk apparatus according to claim 12, wherein said second portion of said spring structure is disposed approximately 7 mm apart from said inner surface of said casing prior to being compressed by said one of said pad members.

15. A disk apparatus according to claim 12, wherein said spring structure is formed of a plastic sheeting consisting essentially of polyethylene terephthalate.

16. A disk apparatus according to claim 12, wherein said convex curve shape is on a side of said spring structure facing away from said pad members.

* * * * *